(12) United States Patent
Sasaki

(10) Patent No.: US 11,280,205 B2
(45) Date of Patent: Mar. 22, 2022

(54) STEAM TURBINE AND METHOD OF MANUFACTURING STEAM TURBINE

(71) Applicant: MITSUBISHI HEAVY INDUSTRIES COMPRESSOR CORPORATION, Tokyo (JP)

(72) Inventor: Yuichi Sasaki, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 75 days.

(21) Appl. No.: 16/531,745

(22) Filed: Aug. 5, 2019

(65) Prior Publication Data
US 2020/0049023 A1 Feb. 13, 2020

(30) Foreign Application Priority Data
Aug. 7, 2018 (JP) .............................. JP2018-148626

(51) Int. Cl.
| F01D 11/00 | (2006.01) |
| F01D 25/26 | (2006.01) |
| F01D 25/16 | (2006.01) |
| F01D 9/04  | (2006.01) |

(52) U.S. Cl.
CPC .............. F01D 11/005 (2013.01); F01D 9/04 (2013.01); F01D 25/162 (2013.01); F01D 25/26 (2013.01); F05D 2230/60 (2013.01); F05D 2240/11 (2013.01); F05D 2240/14 (2013.01); F05D 2240/50 (2013.01)

(58) Field of Classification Search
None
See application file for complete search history.

(56) References Cited

U.S. PATENT DOCUMENTS

| 3,788,767 A * | 1/1974 | Bednarczyk .......... F01D 25/246 415/209.4 |
| 6,594,555 B2 * | 7/2003 | Steingraeber ......... F01D 25/285 700/279 |
| 9,683,457 B2 * | 6/2017 | Misawa .................. F01D 25/16 |
| 2002/0082726 A1 * | 6/2002 | Steingraeber ............ G01B 7/31 700/57 |

(Continued)

FOREIGN PATENT DOCUMENTS

| JP | S46-005845 Y1 | 3/1971 |
| JP | 2004-516415 A | 6/2004 |

(Continued)

*Primary Examiner* — Juan G Flores
*Assistant Examiner* — Jason Fountain
(74) *Attorney, Agent, or Firm* — Osha Bergman Watanabe & Burton LLP

(57) ABSTRACT

A steam turbine includes a casing which is dividable and of which both ends are open, and a bundle accommodated in the casing. The bundle includes a rotor, a plurality of diaphragms which can be divided, a bundle casing to which the diaphragm is fixed inside thereof, and a bearing portion fixed to an inside of the bundle casing on an outside of the diaphragm, and a seal portion fixed to the inside of the bundle casing between the diaphragm and the bearing portion. The bundle casing can be attached and detached to and from the casing in a state of holding the rotor, the diaphragm, the bearing portion, and the seal portion.

3 Claims, 3 Drawing Sheets

(56) References Cited

U.S. PATENT DOCUMENTS

| | | | |
|---|---|---|---|
| 2014/0334919 A1* | 11/2014 | Misawa | F01D 25/162 |
| | | | 415/170.1 |
| 2016/0131115 A1 | 5/2016 | Uptigrove et al. | |
| 2016/0153293 A1 | 6/2016 | Mori et al. | |

FOREIGN PATENT DOCUMENTS

| | | |
|---|---|---|
| JP | 4507877 B2 | 7/2010 |
| JP | 2013-148064 A | 8/2013 |
| JP | 2016-522343 A | 7/2016 |
| JP | 2016-530431 A | 9/2016 |
| WO | 02/052128 A1 | 7/2002 |

\* cited by examiner

//1//

STEAM TURBINE AND METHOD OF MANUFACTURING STEAM TURBINE

BACKGROUND

Field

The present disclosure relates to a steam turbine and a method of manufacturing a steam turbine.

Priority is claimed on Japanese Patent Application No. 2018-148626, filed on Aug. 7, 2018, the content of which is incorporated herein by reference.

Description of Related Art

A steam turbine includes a rotor that rotates centering on an axis and a casing that covers the rotor. The rotor includes a rotor shaft extending in an axial direction centering on the axis, and a plurality of rotor blades disposed around the rotor shaft. In the casing, a diaphragm having a plurality of nozzles (nozzles) disposed around the rotor is fixed on an upstream side of each rotor blade. Such a steam turbine has a structure in which a cylindrical casing and an annular diaphragm are divided up and down from the viewpoint of assembly and the like.

In Patent Document 1, a steam turbine is described which includes a rotor to which a rotor blade is attached, a divided nozzle diaphragm that holds a nozzle and is capable of being divided up and down, a ring-shaped inner casing that holds the divided nozzle diaphragm, and an outer casing that accommodates the inner casing inside thereof. The inner casing is divided into stages such that a plurality of ring-shaped members are aligned in an axial direction, and is accommodated in the outer casing which is capable of being divided up and down.

REFERENCE

Patent Document

[Patent Document 1] Japanese Patent No. 4507877

SUMMARY

Problems to be Solved

In a case of assembling the steam turbine having a structure in which the casing and the diaphragm are divided up and down, with an upper half casing being a ceiling, an upper half diaphragm is disposed, a lower half diaphragm is disposed with respect to a lower half casing, and then components are disposed in the order of the rotor and the upper half casing. In a case where the steam turbine is maintained or disassembled, conversely, the components are removed in the order of the upper half casing, the upper half diaphragm, the rotor, and the lower half diaphragm. Therefore, it takes a lot of time to complete the disassembly or assembly of the steam turbine. Furthermore, as the steam turbine becomes larger, work can be expensive and may take weeks each time. Therefore, it is desirable to perform the assembly in a short time.

The present disclosure provides a steam turbine and a method of manufacturing a steam turbine that can reduce assembly time.

Means to Solve the Problems

A steam turbine according to a first aspect of the present disclosure includes: a casing which is divided into an upper half casing on an upper side in a vertical direction and a lower half casing on a lower side in the vertical direction by a dividing surface, and which has a cylindrical shape open at both ends; and a bundle which is accommodated in the casing such that both ends thereof protrude from an opening of the casing. The bundle includes a rotor rotatable centering on an axis, a plurality of diaphragms which have a ring shape covering the rotor from an outside in a radial direction relative to the axis, and are divided into upper half diaphragms on the upper side in the vertical direction and lower half diaphragms on the lower side in the vertical direction by a dividing surface, a bundle casing which has a cylindrical shape covering the rotor and the plurality of the diaphragms from the outside in the radial direction, and to which the plurality of the diaphragms are fixed inside thereof, a bearing portion which is fixed to an inside of the bundle casing on an outside of the plurality of the diaphragms in the axial direction in which the axis extends, and rotatably supports the rotor, and a seal portion which is fixed to the inside of the bundle casing between the plurality of the diaphragms and the bearing portion in the axial direction, and seals between an outer peripheral surface of the rotor and an inner peripheral surface of the bundle casing. The bundle casing is detachably attached to the casing in a state of holding the rotor, the plurality of the diaphragm, the bearing portion, and the seal portion.

According to such a configuration, the rotor, the diaphragm, the bearing portion, and the seal portion are held by the bundle casing, and are an integrated component as a bundle. Therefore, the rotor, the diaphragm, the bearing portion, and the seal portion can be moved together only by moving the bundle. Therefore, when the components of the steam turbine are moved, work time can be greatly reduced.

In addition, in the steam turbine according to a second aspect of the present disclosure, in the first aspect, a position of the bearing portion in the axial direction may be disposed at a position deviated from a position of the casing in the axial direction.

According to such a configuration, it is possible to separate, in the axial direction, a position of the bearing portion which is in an oil atmosphere where lubricating oil is used and a position of a region through which high-temperature steam flows. Therefore, it is possible to suppress an occurrence of a defect caused by the lubricating oil due to the heat of the steam in the bundle.

In addition, in the steam turbine according to a third aspect of the present disclosure, in the first or second aspect, the casing may include a casing inlet port through which a working fluid flows in from an outside of the casing into an inside of the casing, and a casing exhaust port through which the working fluid circulating the inside of the casing discharges to the outside of the casing. The bundle casing may include a bundle inlet hole communicating with the casing inlet port and a bundle exhaust hole communicating with the casing exhaust port.

According to such a configuration, it is possible to almost form a path through which the steam flowing in from the casing inlet port and discharging from the casing exhaust port flows with components in the bundle. Therefore, after the bundle is attached to the lower half casing and upper half casing, there is no need to finely adjust internal components for efficient flow of steam. Therefore, when the components of the steam turbine are assembled, work can be further shortened.

In addition, a method of manufacturing a steam turbine according to a fourth aspect of the present disclosure includes: an internal component preparation step of preparing a rotor rotatable centering on an axis, a plurality of diaphragms which have a ring shape covering the rotor from an outside in a radial direction relative to the axis, and are divided into upper half diaphragms on an upper side in a vertical direction and lower half diaphragms on a lower side in the vertical direction by a dividing surface, a bundle casing which has a cylindrical shape covering the rotor and the plurality of the diaphragms from the outside in the radial direction, and to which the plurality of the diaphragms are fixed inside thereof, a bearing portion which is fixed to an inside of the bundle casing on an outside of the plurality of the diaphragms in the axial direction in which the axis extends, and rotatably supports the rotor, and a seal portion which is fixed to the inside of the bundle casing between the plurality of the diaphragms and the bearing portion in the axial direction and seals between an outer peripheral surface of the rotor and an inner peripheral surface of the bundle casing; a bundle preparation step of disposing the rotor in the inside of the bundle casing and fixing the plurality of the diaphragms, the bearing portion, and the seal portion to the inside of the bundle casing in a state where the rotor is covered from the outside in the radial direction to prepare the bundle, after the internal component preparation step; a casing preparation step of preparing a casing which is divided into an upper half casing on the upper side in the vertical direction and a lower half casing on the lower side in the vertical direction by a dividing surface, and which has a cylindrical shape open at both ends; a bundle disposition step of lowering the bundle from on the upper side in the vertical direction with respect to the lower half casing, and disposing the lower half diaphragm on an inner peripheral side of the lower half casing, after the casing preparation step; and an upper half casing disposition step of lowering the upper half casing from on the upper side in the vertical direction with respect to the lower half casing, disposing the upper half diaphragm on the inner peripheral side of the upper half casing, and causing a dividing surface of the upper half casing and a dividing surface of the lower half casing to come into contact with each other, after the bundle disposition step.

Effects

According to the present disclosure, an assembly time can be shortened.

DETAILED DESCRIPTION OF THE INVENTION

Hereinafter, a steam turbine 1 of an embodiment of the present disclosure will be explained in detail with reference to drawings.

Figure 1:
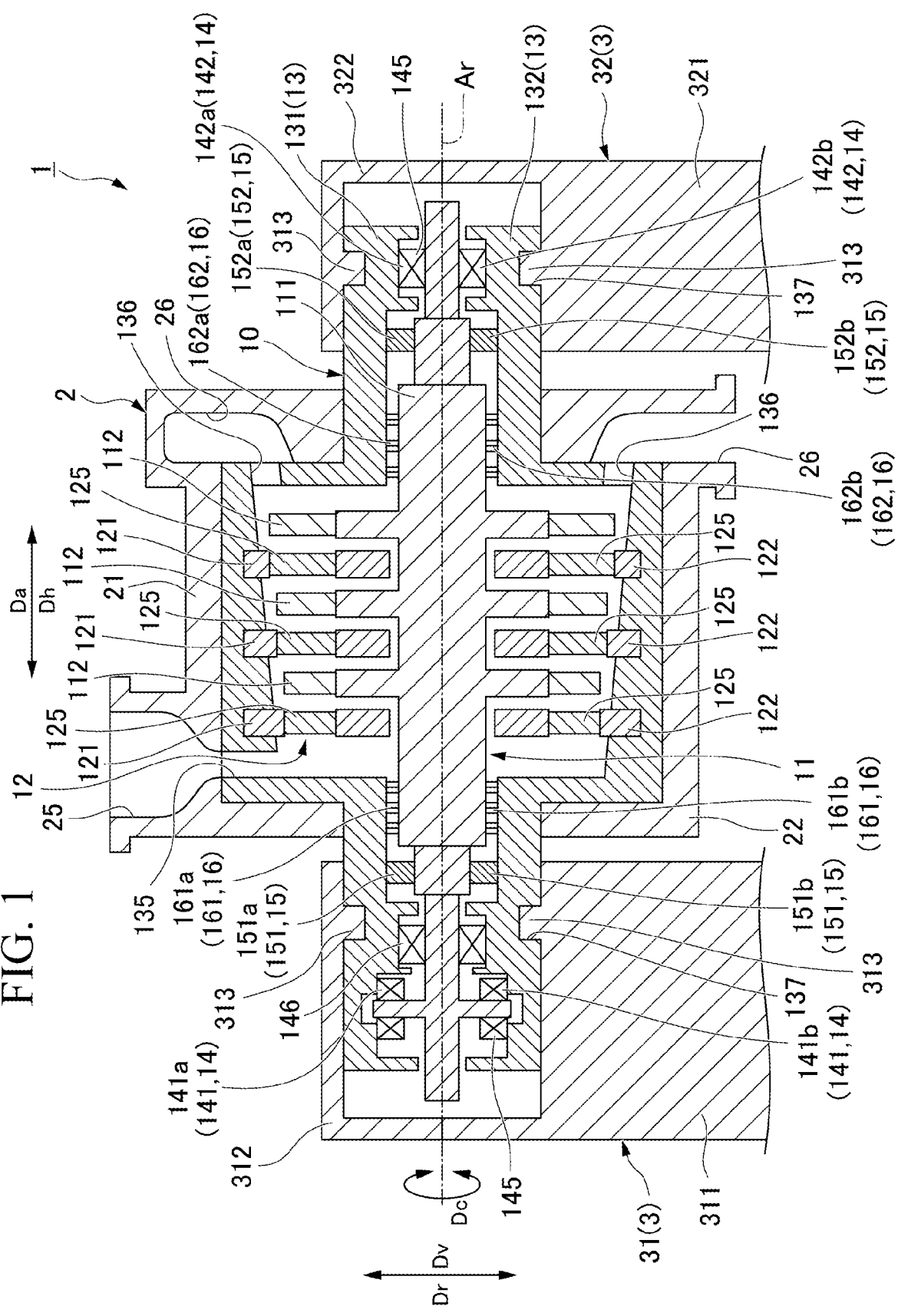
FIG. 1 is a sectional view of a steam turbine according to an embodiment of the present disclosure.

As illustrated in FIG. 1, the steam turbine 1 includes a casing 2, a bundle 10, and a bearing pedestal 3.

In the following, a direction in which an axis Ar of a rotor 11 described later extends is taken as an axial direction Da. A radial direction relative to the axis Ar as a reference is simply referred to as a radial direction Dr. In the radial direction Dr, upward on a paper surface of FIG. 1 is taken as a vertical direction Dv. Further, a horizontal direction in FIG. 1 is taken as a horizontal direction Dh orthogonal to the vertical direction Dv. Further, a direction around the rotor 11 centering on the axis Ar is taken as a circumferential direction Dc.

The casing 2 is disposed to cover a bundle 10 from an outer peripheral side. The casing 2 has a cylindrical shape of which both ends are open centering on a central axis disposed identical to the axis Ar of a rotor 11 described later. The casing 2 is provided with a casing inlet port 25 for guiding steam to an internal steam flow path, and a casing exhaust port 26 for discharging the steam flowing through the steam flow path to the outside. The casing 2 includes an upper half casing 21 on an upper side and a lower half casing 22 on a lower side in the vertical direction Dv with the axis Ar as the reference of the rotor 11.

The upper half casing 21 extends in the circumferential direction Dc. The upper half casing 21 has a cross section orthogonal to the axis Ar having a semicircular ring shape centering on the axis Ar. The upper half casing 21 is open downward in the vertical direction Dv so that an upper half of the bundle 10 is capable of being accommodated. The upper half casing 21 includes dividing surfaces (upper half casing dividing surface) at both ends in the circumferential direction Dc. The dividing surface of the upper half casing 21 is a horizontal surface facing downward in the vertical direction Dv.

The lower half casing 22 extends in the circumferential direction Dc. The lower half casing 22 has a cross section orthogonal to the axis Ar having a semicircular ring shape centering on the axis Ar. An inner diameter of the lower half casing 22 is formed to have the same size as an inner diameter of the upper half casing 21. The lower half casing 22 is open upward in the vertical direction Dv so that a lower half of the bundle 10 is capable of being accommodated. The lower half casing 22 includes dividing surfaces (lower half casing dividing surfaces) at both ends in the circumferential direction Dc. The dividing surface of the lower half casing 22 is a horizontal surface facing upward in the vertical direction Dv. The upper half casing 21 is placed on the upper side in the vertical direction Dv with respect to the lower half casing 22, and is fixed by fastening members such as bolts (not illustrated) in a state where the dividing surfaces are in contact with each other. Thus, the casing 2 is formed.

The bundle 10 is accommodated in the casing 2. The bundle 10 of the present embodiment includes the rotor 11, a plurality of diaphragms 12, a bundle casing 13, a plurality of bearing portions 14, a plurality of oil-slinger portions 15, and a plurality of seal portions 16. In the bundle 10, the rotor 11, the diaphragm 12, the bundle casing 13, the bearing portion 14, the oil-slinger portion 15, and the seal portion 16 are integrally formed to be movable state with respect to the casing 2. In the bundle 10, relative positions of the rotor 11, the diaphragm 12, the bearing portion 14, the oil-slinger portion 15, and the seal portion 16 with respect to the bundle casing 13 are held in an immovable state. Both ends of the bundle 10 protrude from openings formed at both ends of the casing 2 in the axial direction Da.

The rotor 11 is rotatable centering on an axis Ar. The rotor 11 includes a rotor shaft 111 extending in the axial direction Da centering on the axis Ar, and a plurality of rotor blades 112 aligned in the circumferential direction Dc with respect to the rotor shaft 111 and fixed to the rotor shaft 111.

The diaphragm 12 is disposed on the outer peripheral side of the rotor shaft 111. The diaphragm 12 has a ring shape centering on the axis Ar. A plurality of diaphragms 12 are disposed apart in the axial direction Da. The outer peripheral portion of the diaphragm 12 which is on the outside in the radial direction Dr is fixed to the bundle casing 13. A plurality of nozzles (nozzles) 125 aligned in the circumferential direction Dc are provided near a middle of the ring-shaped diaphragm 12 in the radial direction Dr. The nozzle 125 is disposed at a position upstream of the rotor blade 112 of the rotor 11 in the axial direction Da. In the steam turbine 1, a cylindrical space in the vicinity of the outer peripheral side of the rotor shaft 111 and the middle of the annular diaphragm 12, in other words, a space in which the rotor blades 112 and the nozzles 125 are disposed is a steam flow path through which steam as a working fluid flows. The ring-shaped diaphragm 12 includes an upper half diaphragm 121 on the upper side and a lower half diaphragm 122 on the lower side in the vertical direction Dv with respect to the axis Ar of the rotor 11.

The upper half diaphragm 121 extends in the circumferential direction Dc. The upper half diaphragm 121 is fixed to the upper half casing 21 in a state of being accommodated inside the upper half casing 21. The upper half diaphragm 121 has a cross section orthogonal to the axis Ar, having a semicircular ring shape centering on the axis Ar. The upper half diaphragm 121 is open downward in the vertical direction Dv so that the rotor 11 can be fitted. The upper half diaphragm 121 has dividing surfaces (upper half diaphragm dividing surfaces) at both ends in the circumferential direction Dc. The dividing surface of the upper half diaphragm 121 is a horizontal surface facing downward in the vertical direction Dv.

The lower half diaphragm 122 extends in the circumferential direction Dc. The lower half diaphragm 122 is fixed to the lower half casing 22 in a state of being accommodated inside the lower half casing 22. The lower half diaphragm 122 has a cross section orthogonal to the axis Ar, having a semicircular ring shape centering on the axis Ar. The lower half diaphragm 122 is open upward in the vertical direction Dv so that the rotor 11 can be fitted. The lower half diaphragm 122 has dividing surfaces (lower half diaphragm dividing surfaces) at both ends in the circumferential direction Dc. The dividing surface of the lower half diaphragm 122 is a horizontal surface facing upward in the vertical direction Dv. The upper half diaphragm 121 is placed on the upper side in the vertical direction Dv with respect to the lower half diaphragm 122, and is fixed by fastening members (not illustrated) such as bolts in a state where the dividing surfaces are in contact with each other. Therefore, the diaphragm 12 is formed.

The bundle casing 13 has a cylindrical shape that covers the rotor 11, the diaphragm 12, the bearing portion 14, the oil-slinger portion 15, and the seal portion 16 from the outside in the radial direction Dr. Openings are formed at both ends of the bundle casing 13 in the axial direction Da. The bundle casing 13 is formed such that a length in the axial direction Da is shorter than that of the rotor shaft 111. Therefore, the rotor shaft 111 protrudes from the openings at both ends in the axial direction Da. The bundle casing 13 is formed such that a length in the axial direction Da is longer than that of the casing 2. Therefore, the end portion in the axial direction Da protrudes from the opening of the casing 2. The bundle casing 13 can be attached and detached to and from the casing 2 in a state of holding the components (rotor 11, diaphragm 12, bearing portion 14, oil-slinger portion 15, and seal portion 16) accommodated on the inside thereof. The bundle casing 13 is fixed to the casing 2 in a state of being accommodated in the casing 2 when the steam turbine 1 is in operation. The bundle casing 13 can be divided up and down with the horizontal surface as a reference passing through the axis Ar. The bundle casing 13 can be divided into an upper half bundle casing 131 and a lower half bundle casing 132. The upper half diaphragm 121 is fixed to the inside of the upper half bundle casing 131. The lower half diaphragm 122 is fixed to the inside of the lower half bundle casing 132. The bundle casing 13 includes a bundle inlet hole 135 communicating with the casing inlet port 25, a bundle exhaust hole 136 communicating with the casing exhaust port 26, and a bundle groove portion 137 recessed from the outer peripheral surface.

The bundle inlet hole 135 is formed to penetrate the bundle casing 13 in the radial direction Dr. The bundle exhaust hole 136 is formed to penetrate the bundle casing 13 in the axial direction Da. The steam flowed into the casing 2 from the casing inlet port 25 flows into the bundle casing 13 from the bundle inlet hole 135. The steam flowed into the bundle casing 13 flows through the steam flow path, flows into the casing exhaust port 26 from the bundle exhaust hole 136, and is discharged to the outside of the casing 2. The bundle groove portion 137 is a groove which is recessed from the outer peripheral surface of the bundle casing 13 so as to have a rectangular cross section. The bundle groove portion 137 is formed at two positions separated in the axial direction Da so as to correspond to a position of the bearing pedestal 3 described later.

The bearing portion 14 rotatably supports the rotor shaft 111 centering on the axis Ar. The bearing portion 14 is fixed in a state of being accommodated in the bundle casing 13. The position of the bearing portion 14 in the axial direction Da is a position (position not overlapping with the casing 2) deviated from the position of the casing 2 in the axial direction Da. That is, the bearing portion 14 is disposed outside the diaphragm 12 and the casing 2 in the axial direction Da. The bearing portion 14 includes a first bearing portion 141 and a second bearing portion 142.

The first bearing portion 141 is provided on one side (upstream side of the steam turbine 1) in the axial direction Da with respect to the casing 2. The first bearing portion 141 supports the rotor 11 using lubricating oil. The first bearing portion 141 of the present embodiment is a journal bearing 145 and a thrust bearing 146 of a type that uses lubricating oil. The journal bearing 145 receives a load in the radial direction Dr, acting on the rotor shaft 111. The thrust bearing 146 receives a load in the axial direction Da, acting on the rotor shaft 111. The thrust bearing 146 is disposed on one side of the journal bearing 145 in the axial direction Da. The first bearing portion 141 can be divided up and down with the horizontal surface as the reference passing through the axis Ar. The first bearing portion 141 can be divided into an upper half first bearing portion 141a and a lower half first bearing portion 141b.

The second bearing portion 142 is provided on the other side (downstream side of the steam turbine 1) in the axial direction Da with respect to the casing 2. The second bearing portion 142 supports the rotor 11 using lubricating oil. The second bearing portion 142 in the present embodiment is a journal bearing 145 of a type that uses lubricating oil. The journal bearing 145 which is the second bearing portion 142 is the same as the journal bearing 145 of the first bearing portion 141. The second bearing portion 142 can be divided up and down with the horizontal surface as the reference passing through the axis Ar. The second bearing portion 142 can be divided into an upper half second bearing portion 142a and a lower half second bearing portion 142b.

The oil-slinger portion 15 is fixed to the bundle casing 13 between the diaphragm 12 and the bearing portion 14 in the axial direction Da. Specifically, the position of the oil-slinger portion 15 in the axial direction Da is set to a position (position on the inside in the axial direction Da) closer to the casing 2 than the bearing portion 14. Further, the position of the oil-slinger portion 15 in the axial direction Da is a position (position not overlapping with the casing 2) deviated from the position of the casing 2 in the axial direction Da. The oil-slinger portion 15 is provided with unevenness by oil groove and fins (not illustrated) provided in a gap between the rotor shaft 111 and the bundle casing 13, and prevents leakage of the lubricating oil using a centrifugal force. That is, the oil-slinger portion 15 suppresses the leakage of the lubricating oil from the bearing portion 14 to the inside in the axial direction Da in the bundle casing 13. The oil removal part 15 of the present embodiment includes a first oil removal part 151 and a second oil removal part 152.

The first oil-slinger portion 151 is disposed on a side closer to the casing 2 in the axial direction Da than the first bearing portion 141 and at a position which does not overlap the casing 2. The first oil-slinger portion 151 suppresses the leakage of the lubricating oil from the first bearing portion 141. The first oil-slinger portion 151 can be divided up and down with the horizontal surface as the reference passing through the axis Ar. The first oil-slinger portion 151 can be divided into an upper half first oil-slinger portion 151a and a lower half first oil-slinger portion 151b.

The second oil-slinger portion 152 is disposed on the side closer to the casing 2 in the axial direction Da than the second bearing portion 142 and at a position which does not overlap the casing 2. The second oil-slinger portion 152 suppresses the leakage of the lubricating oil from the second bearing 142. The second oil-slinger portion 152 can be divided up and down with the horizontal surface as the reference passing through the axis Ar. The second oil-slinger portion 152 can be divided into an upper half second oil-slinger portion 152a and a lower half second oil-slinger portion 152b.

The seal portion 16 is fixed to the inside of the bundle casing 13 between the diaphragm 12 and the oil-slinger portion 15 in the axial direction Da. The seal portion 16 seals an entire circumference between the outer peripheral surface of the rotor shaft 111 and the inner peripheral surface of the bundle casing 13 to prevent the working fluid from leaking to the oil-slinger portion 15. As the seal portion 16, for example, a labyrinth seal is preferable. The seal portion 16 of the present embodiment has a first seal portion 161 and a second seal portion 162.

The first seal portion 161 is disposed on the inside in the axial direction Da with respect to the first oil-slinger portion 151 and at a position which overlaps the casing 2 in the axial direction Da. The first seal portion 161 suppresses leakage of steam from the upstream of the steam flow path. The first seal portion 161 can be divided up and down with the horizontal surface as the reference passing through the axis Ar. The first seal portion 161 can be divided into an upper half first seal portion 161a and a lower half first seal portion 161b.

The second seal portion 162 is disposed on the inside in the axial direction Da with respect to the second oil-slinger portion 152 and at a position which overlaps the casing 2 in the axial direction Da. The first seal portion 161 suppresses leakage of steam from the downstream of the steam flow path. The second seal portion 162 can be divided up and down with the horizontal surface as the reference passing through the axis Ar. The second seal portion 162 can be divided into an upper half second seal portion 162a and a lower half second seal portion 162b.

The bearing pedestal 3 is installed on the floor surface to support the both ends of the bundle 10. The bearing pedestal 3 of the present embodiment includes a first bearing pedestal cover 31 and a second bearing pedestal cover 32.

The first bearing pedestal cover 31 supports one end portion of the bundle 10 in the axial direction Da. The first bearing pedestal cover 31 is disposed on the floor surface on one side in the axial direction Da with respect to the casing 2. The first bearing pedestal cover 31 is formed with only one through-hole through which the bundle casing 13 can be inserted so as to cover one end portion of the bundle 10 in the axial direction Da. The first bearing pedestal cover 31 can be divided up and down with the horizontal surface as the reference passing through the axis Ar. The first bearing pedestal cover 31 includes a first bearing pedestal 311 disposed on the lower side in the vertical direction Dv with respect to the axis Ar, and a first bearing cover portion 312 disposed on the upper side in the vertical direction Dv with respect to the axis Ar. Positioning protrusion portions 313 to be inserted into the bundle grooves 137 are formed on the first bearing pedestal 311 and the first bearing cover portion 312.

The second bearing pedestal cover 32 supports the other end portion of the bundle 10 in the axial direction Da. The second bearing pedestal cover 32 is provided on the opposite side to the first bearing pedestal cover 31 across the casing 2 in the axial direction Da. The second bearing pedestal cover 32 is disposed on the floor surface on the other side in the axial direction Da with respect to the casing 2. The second bearing pedestal cover 32 is formed with only one through-hole through which the bundle casing 13 can be inserted so as to cover the other end portion of the bundle 10 in the axial direction Da. The second bearing pedestal cover 32 can be divided up and down with the horizontal surface as the reference passing through the axis Ar. The second bearing pedestal cover 32 includes a second bearing pedestal 321 disposed on the lower side in the vertical direction Dv with respect to the axis Ar, and a second bearing crown 322 disposed on the upper side in the vertical direction Dv with respect to the axis Ar. Similarly to the first bearing pedestal 311 and the first bearing cover portion 312, positioning protrusion portions 313 to be inserted into the bundle groove portion 137 are also formed on the second bearing pedestal 321 and the second bearing cover portion 322.

Figure 2:
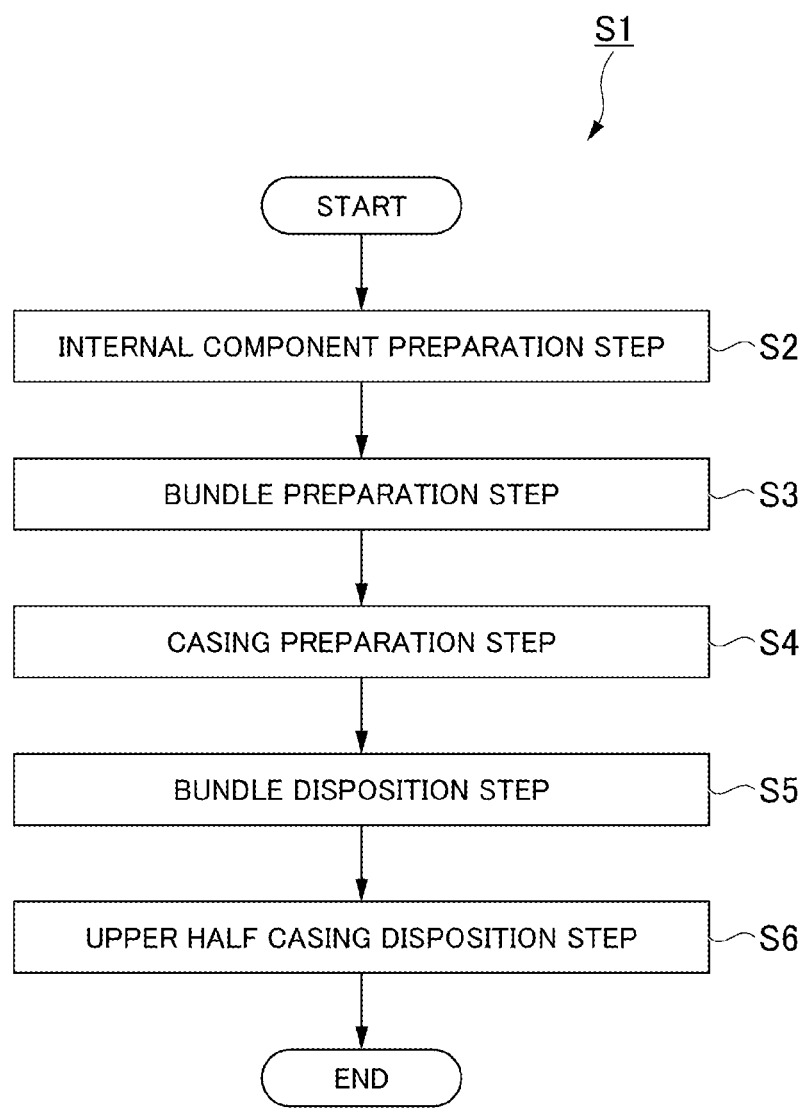
FIG. 2 is a flowchart of a method of manufacturing a steam turbine of an embodiment of the present disclosure.

Next, a method S1 of manufacturing the steam turbine of the present embodiment will be explained. As illustrated in FIG. 2, the method S1 of manufacturing the steam turbine according to the present embodiment includes an internal component preparation step S2, a bundle preparation step S3, a casing preparation step S4, a bundle disposition step S5, and an upper half casing disposition step S6.

In the internal component preparation step S2, the internal components of the steam turbine 1 necessary for manufacturing the bundle 10 are prepared. In the internal component preparation step S2 of the present embodiment, the rotor 11, the diaphragm 12, the bundle casing 13, the bearing portion 14, the oil-slinger portion 15, and the seal portion 16 are each manufactured and prepared.

The bundle preparation step S3 is performed after the internal component preparation step S2. In the bundle preparation step S3, the bundle 10 is assembled using the components prepared in the internal component preparation step S2. For example, the plurality of lower half diaphragms 122, the lower half first seal portion 161b, the lower half second seal portion 162b, the lower half first oil-slinger portion 151b, the lower half second oil removal portion 152b, the lower half first bearing portion 141b, and the lower half second bearing portion 142b are fixed by fastening members (not illustrated) such as bolts with respect to the lower half bundle casing 132. Thereafter, the rotor 11 is disposed from on the upper side in the vertical direction Dv with respect to the lower half bundle casing 132 to which each component is fixed. In a state where the rotor 11 is disposed, the plurality of upper half diaphragms 121 are fixed to the lower half diaphragm 122, and the diaphragm 12 is formed. Similarly, the first seal portion 161, the second seal portion 162, the first oil-slinger portion 151, the second oil-slinger portion 152, the first bearing portion 141, and the second bearing portion 142 are formed. Thereafter, the upper half bundle casing 131 is disposed from on the upper side in the vertical direction Dv. The plurality of upper half diaphragms 121, the upper half first seal portion 161a, the upper half second seal portion 162a, the upper half first oil-slinger portion 151a, the upper half second oil-slinger portion 152a, the upper half first bearing portion 141a, and the upper half second bearing portion 142a are fixed by fastening members (not illustrated) such as bolts to the upper half bundle casing 131. Therefore, the bundle 10 integrated as one component is prepared.

Figure 3:
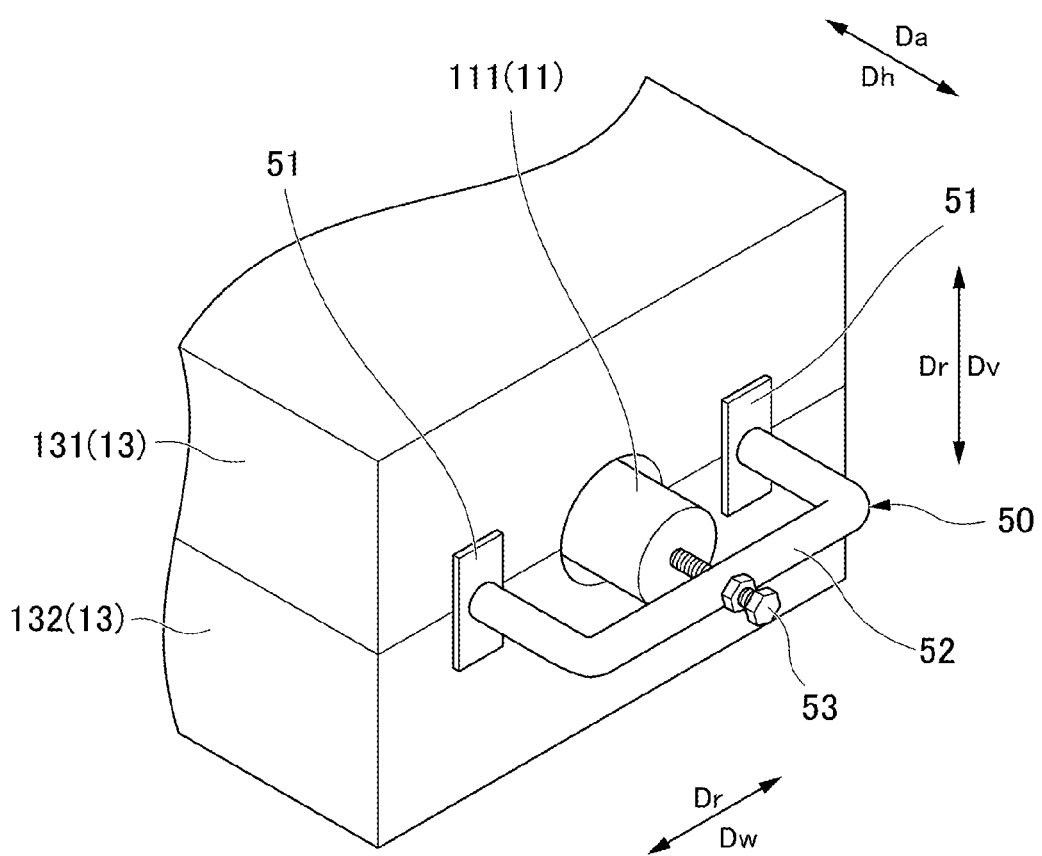
FIG. 3 is a perspective view of a main portion for explaining an axial position-fixing jig in a bundle of the present disclosure.

Thereafter, as illustrated in FIG. 3, the relative position of the rotor shaft 111 in the axial direction Da with respect to the bundle casing 13 is fixed. Specifically, in the bundle preparation step S3, the axial position-fixing jig 50 is attached to the end surface of the bundle casing 13 in the axial direction Da in a state where the lower half bundle casing 132 and the upper half bundle casing 131 are combined.

The axial position-fixing jig 50 includes a pair of casing-fixing portions 51 fixed to the bundle casing 13, a connecting portion 52 connecting the pair of casing-fixing portions 51, and a rotor-fixing portion 53 capable of fixing the connecting portion 52 and the rotor shaft 111.

The casing-fixing portion 51 is fixed to the end surface of the bundle casing 13 in a state of straddling the upper half bundle casing 131 and the lower half bundle casing 132. The casing-fixing portion 51 is fixed to the upper half bundle casing 131 and the lower half bundle casing 132 by fastening members such as bolts (not illustrated). The casing-fixing portion 51 is disposed apart from the bundle casing 13 in the width direction Dw (direction orthogonal to the vertical direction Dv and the axial direction Da in the radial direction Dr) so as to sandwich the rotor shaft 111.

The connecting portion 52 is integrally connected to the pair of casing-fixing portions 51 so as to cover the end portion of the rotor shaft 111 protruding from the bundle casing 13 from the outside in the axial direction Da. The connecting portion 52 is a cylindrical member extending between the pair of casing-fixing portions 51 so as to form a C shape when viewed in the vertical direction Dv. That is, the casing-fixing portion 51 is fixed to both ends of the connecting portion 52. A bolt insertion hole (not illustrated) through which a bolt member can be inserted is formed at a center portion of the connecting portion 52 in the width direction Dw. The bolt insertion hole is formed at the same position as a bolt-fixing hole (not illustrated) formed on the end surface of the rotor shaft 111 when viewed in the axial direction Da.

The rotor-fixing portion 53 is a long bolt member provided with an external thread on an outer peripheral surface. In the rotor-fixing portion 53, a nut capable of relative movement is provided in the middle of the screw portion. One end of the rotor-fixing portion 53 is fixed to the bolt-fixing hole in a state of being inserted into the bolt insertion hole. The rotor-fixing portion 53 regulates the position of the rotor shaft 111 in the axial direction Da with respect to the bundle casing 13 by being moved to a position where the nut is in contact with the connecting portion 52 in a state of being fixed to the rotor shaft 111.

A specific method of attaching the axial position-fixing jig 50 in the bundle preparation step S3 will be described. In the bundle preparation step S3, the casing-fixing portions 51 are each fixed to the lower half bundle casing 132 and the upper half bundle casing 131. Thereafter, the rotor-fixing portion 53 is inserted into the bolt insertion hole of the connecting portion 52, and one end of the rotor-fixing portion 53 is fixed to the bolt-fixing hole. The position of the nut is adjusted in a state where the rotor-fixing portion 53 is fixed to the rotor shaft 111, so that in the bundle 10, the position of the rotor shaft 111 with respect to the bundle casing 13 in the axial direction Da is fixed.

As illustrated in FIG. 2, the casing preparation step S4 is performed after the bundle preparation step S3. In the casing preparation step S4 of the present embodiment, components other than the bundle 10 are prepared. For example, in the casing preparation step S4, the casing 2 and the bearing pedestal 3 are manufactured and prepared.

The bundle disposition process S5 is performed after the casing preparation process S4. In the bundle disposition step S5, the lower half casing 22, the first bearing pedestal 311, and the second bearing pedestal 321 are disposed at setting locations. In the bundle disposition step S5, the bundle 10 is disposed from on the upper side in the vertical direction Dv with respect to the lower half casing 22, the first bearing pedestal 311, and the second bearing pedestal 321. The bundle 10 is once lifted on the upper side in the vertical direction Dv by a crane or the like, and then adjusted in horizontal position and lowered. When the bundle 10 is disposed inside the lower half casing 22, the bundle 10 is lowered so that the bundle groove portion 137 is fitted to the positioning protrusion portions 313 of the first bearing pedestal 311 and the second bearing pedestal 321. As a result, the bundle 10 is disposed with respect to the lower casing 22, the first bearing pedestal 311, and the second bearing pedestal 321.

The upper half casing disposition process S6 is executed after the bundle disposition process S5. In the upper half casing disposition step S6, the upper half casing 21 is disposed from on the upper side in the vertical direction Dv with respect to the bundle 10 fitted into the lower half casing 22. The upper half casing 21 is once lifted on the upper side in the vertical direction Dv using a crane or the like. Thereafter, the upper half casing 21 is lowered on the upper side of the bundle 10.

When the upper half casing 21 is lowered to the vicinity of the lower half casing 22, the horizontal position is adjusted so that the bundle 10 is accommodated on the inner peripheral side of the upper half casing 21. Thereafter, the upper half casing 21 and the lower half casing 22 are fixed in a state where the dividing surface of the upper half casing 21 abuts against the dividing surface of the lower half casing 22.

Furthermore, in the upper half casing disposition step S6, the first bearing cover portion 312 is attached to the end portion of the bundle 10 fitted into the first bearing pedestal 311 in the same manner as the upper half casing 21. In this case, the first bearing cover portion 312 is attached such that the positioning protrusion portion 313 of the first bearing pedestal cover portion 312 is inserted into the bundle groove portion 137. Further, the second bearing cover portion 322 is attached to the end portion of the bundle 10 fitted into the second bearing pedestal 321 in the same manner as the upper half case 21. In this case, the second bearing cover portion 322 is attached such that the positioning protrusion portion 313 of the second bearing cover portion 322 is inserted into the bundle groove portion 137. As a result, the steam turbine 1 is completed.

According to the steam turbine 1 and the method S1 of manufacturing the steam turbine as described above, the rotor 11, the diaphragm 12, the bearing portion 14, the oil-slinger portion 15, and the seal portion 16 are held by the bundle casing 13, and are an integral component as the bundle 10. Therefore, the rotor 11, the diaphragm 12, the bearing portion 14, the oil-slinger portion 15, and the seal portion 16 can be moved together only by moving the bundle 10. Therefore, when the components of the steam turbine 1 are moved, work can be significantly shortened. That is, the assembly time of the internal components in the steam turbine 1 can be greatly reduced.

Further, the diaphragm 12, the bearing portion 14, the oil-slinger portion 15, and the seal portion 16 are fixed to the bundle casing 13. Therefore, even if the bundle 10 is moved, the relative positions of the diaphragm 12, the bearing portion 14, the oil-slinger portion 15, and the seal portion 16 with respect to the bundle casing 13 hardly change in any of the axial direction Da and the radial direction Dr. Further, the rotor shaft 111 is held with respect to the bundle casing 13 via the diaphragm 12, the bearing portion 14, the oil-slinger portion 15, and the seal portion 16. Further, the rotor shaft 111 is fixed to the bundle casing 13 by the axial position-fixing jig 50. Therefore, the relative position of the rotor shaft 111 with respect to the bundle casing 13 hardly changes in any of the axial direction Da and the radial direction Dr. In other words, even if the bundle 10 is moved, the positions of the components in the bundle casing 13 do not deviate, so that after the bundle 10 is installed, the work for position adjustment of internal components such as the rotor 11, the diaphragm 12, the bearing portion 14, the oil-slinger portion 15, and the seal portion 16 can be shortened.

Further, the first bearing portion 141 and the second bearing portion 142 are fixed to the bundle casing 13 at a position deviated from the casing 2 in the axial direction Da. Therefore, the positions of the first bearing portion 141 and the second bearing portion 142, which are in the oil atmosphere, in which the lubricating oil is used, and the region where the steam flow path through which the high-temperature steam flows is formed can be separated in the axial direction Da. Therefore, it is possible to suppress the occurrence of a defect caused by the lubricating oil due to the heat of steam in the bundle 10.

Further, the bundle inlet hole 135 communicating with the casing inlet port 25 and the bundle exhaust hole 136 communicating with the casing exhaust port 26 are formed in the bundle casing 13. Therefore, the steam flow path which is a path through which the steam which flows in from the casing inlet port 25 and is discharged from the casing exhaust port 26 can be almost formed by the components in the bundle 10. Therefore, after the bundle 10 is attached to the lower half casing 22 and the upper half casing 21, it is not necessary to finely adjust the positions of the internal components for efficient flow of steam. Therefore, when the components of steam turbine 1 are assembled, the work can be further shortened.

Other Modification Examples of Embodiment

As mentioned above, although an embodiment of the present disclosure is explained in detail with reference to drawings, respective configurations and a combination thereof in each embodiment are an example, and addition, omission, redisposition, and other changes of the configurations can be implemented within a range which does not deviate from the gist of the present disclosure. In addition, the present disclosure is not limited by the embodiments, and is limited only by the scope of claims.

For example, the configuration of the bundle 10 is not limited to the configuration of the present embodiment. The bundle 10 may include other configuration elements of the steam turbine 1 excluding the casing 2 and may not include a part of the configuration of the present embodiment.

In addition, for example, in each of the above-described embodiments, the method of manufacturing the steam turbine 1 is described by forming the respective components from 1 and assembling them. The method S1 of manufacturing the steam turbine is not limited to the case of manufacturing the steam turbine 1 from 1. For example, the method S1 of manufacturing the steam turbine may be used when disassembling and reassembling the steam turbine 1 when repair or inspection is performed. In this case, a newly prepared bundle 10 may be attached to the casing 2 in place of the used bundle 10, or the bundle 10 formed again by servicing the used bundle 10 may be attached to the casing 2. In addition, when repair or inspection is performed, a step of removing the upper half casing 21 or a step of removing the used bundle 10 will be further included in advance.

Moreover, in the method S1 of manufacturing the steam turbine, the casing preparation step S4 is not limited to performing after the bundle preparation process S3. The casing preparation step S4 may be performed before the bundle disposition step S5. Therefore, the casing preparation step S4 may be performed before the internal component preparation step S2 or the bundle preparation step S3, or may be performed simultaneously with the internal component preparation step S2 or the bundle preparation step S3.

Further, the bundle 10 is not limited to the structure in which the position of the rotor 11 in the axial direction Da with respect to the bundle casing 13 is restricted by the axial position-fixing jig 50. The bundle 10 only needs to regulate the relative position of the rotor shaft 111 with respect to the bundle casing 13. Therefore, for example, the rotor shaft 111 may be temporarily fixed by another member to the bundle casing 13, and the rotor shaft 111 may be temporarily fixed to the bundle casing 13 through another component such as the diaphragm 12.

While preferred embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

EXPLANATION OF REFERENCES 1 steam turbine
Ar axis
Data axial direction
Driver radial direction
Dc circumferential direction
Dv vertical direction
Dh horizontal direction
Dw width direction
2 casing 21 upper half casing
22 lower half casing
25 casing inlet port
26 casing exhaust port
10 bundle
11 rotor
111 rotor shaft
112 rotor blade
12 diaphragm
121 upper half diaphragm
122 lower half diaphragm
125 nozzle
13 bundle casing
131 upper half bundle casing
132 lower half bundle casing
135 bundle inlet hole
136 bundle exhaust hole
137 bundle groove portion
14 bearing portion
141 first bearing portion
145 journal bearing
146 thrust bearing
141a upper half first bearing portion
141b lower half first bearing portion
142 second bearing portion
142a upper half second bearing portion
142b lower half second bearing portion
15 oil-slinger portion
151 first oil-slinger portion
151a upper half first oil-slinger portion
151b lower first oil-slinger portion
152 second oil-slinger portion
152a upper half second oil-slinger portion
152b lower half second oil-slinger portion
16 seal portion
161 first seal portion
161a upper half first seal portion
161b lower half first seal portion
162 second seal portion
162a upper half second seal portion
162b lower half second seal portion
3 bearing pedestal
31 first bearing pedestal cover
311 first bearing pedestal
312 first bearing cover portion
32 second bearing pedestal cover
321 second bearing pedestal
322 second bearing cover portion
313 positioning protrusion portion
50 axial position-fixing jig
51 casing-fixing portion
52 connecting portion
53 rotor-fixing portion
S1 method of manufacturing steam turbine
S2 internal component preparation step
S3 bundle preparation step
S4 casing preparation step
S5 bundle disposition step
S6 upper half casing disposition step

What is claimed is:

1. A steam turbine comprising:
a casing which is divided into an upper half casing on an upper side in a vertical direction and a lower half casing on a lower side in the vertical direction by a dividing surface, and which has a cylindrical shape with openings at both ends; and
a bundle which is accommodated in the casing such that both ends thereof protrude from the openings of the casing,
wherein the bundle includes
a rotor rotatable centering on an axis,
a plurality of diaphragms which have a ring shape covering the rotor from an outside in a radial direction relative to the axis, and are divided into upper half diaphragms on the upper side in the vertical direction and lower half diaphragms on the lower side in the vertical direction by a dividing surface,
a bundle casing which has a cylindrical shape covering the rotor and the plurality of the diaphragms from the outside in the radial direction, and to which the plurality of the diaphragms are fixed inside thereof,
a bearing portion which is fixed to an inside of the bundle casing on an outside of the plurality of the diaphragms in an axial direction in which the axis extends, and rotatably supports the rotor, and
a seal portion which is fixed to the inside of the bundle casing between the plurality of the diaphragms and the bearing portion in the axial direction, and seals between an outer peripheral surface of the rotor and an inner peripheral surface of the bundle casing, wherein
the bundle casing is detachably attached to the casing in a state of holding the rotor, the plurality of the diaphragms, the bearing portion, and the seal portion,
a length of the bundle casing in the axial direction is greater than a length of the casing in the axial direction such that end portions of the bundle casing in the axial direction protrude from the openings of the casing, and
the bearing portion is fixed to one of the end portions of the bundle casing, the one of the end portions being positioned outside an outermost portion of the casing in the axial direction.

2. The steam turbine according to claim 1,
wherein the casing includes a casing inlet port through which a working fluid flows in from an outside of the casing into an inside of the casing, and a casing exhaust port through which the working fluid circulating the inside of the casing discharges to the outside of the casing, and
wherein the bundle casing includes a bundle inlet hole communicating with the casing inlet port and a bundle exhaust hole communicating with the casing exhaust port.

3. A method of manufacturing a steam turbine comprising:
an internal component preparation step of preparing a rotor rotatable centering on an axis, a plurality of diaphragms which have a ring shape covering the rotor from an outside in a radial direction relative to the axis, and are divided into upper half diaphragms on an upper side in a vertical direction and lower half diaphragms on a lower side in the vertical direction by a dividing surface, a bundle casing which has a cylindrical shape covering the rotor and the plurality of the diaphragms from the outside in the radial direction, and to which the plurality of the diaphragms are fixed inside thereof, a bearing portion which is fixed to an inside of the bundle casing on an outside of the plurality of the diaphragms in an axial direction in which the axis extends, and rotatably supports the rotor, and a seal portion which is fixed to the inside of the bundle casing between the plurality of the diaphragms and the bearing portion in the axial direction and seals between an outer peripheral surface of the rotor and an inner peripheral surface of the bundle casing;

a bundle preparation step of disposing the rotor in the inside of the bundle casing and fixing the plurality of the diaphragms, the bearing portion, and the seal portion to the inside of the bundle casing in a state where the rotor is covered from the outside in the radial direction to prepare a bundle, after the internal component preparation step;

a casing preparation step of preparing a casing which is divided into an upper half casing on the upper side in the vertical direction and a lower half casing on the lower side in the vertical direction by a dividing surface, and which has a cylindrical shape with openings at both ends;

a bundle disposition step of lowering the bundle from the upper side in the vertical direction with respect to the lower half casing, and disposing the lower half diaphragms on an inner peripheral side of the lower half casing, after the casing preparation step; and an upper half casing disposition step of lowering the upper half casing from the upper side in the vertical direction with respect to the lower half casing, disposing the upper half diaphragms on an inner peripheral side of the upper half casing, and causing a dividing surface of the upper half casing and a dividing surface of the lower half casing to come into contact with each other, after the bundle disposition step, wherein, in the internal component preparation step, the bundle casing in which a length of the bundle casing in the axial direction is greater than a length of the casing in the axial direction such that end portions of the bundle casing in the axial direction protrude from the openings of the casing, is prepared, and in the bundle preparation step, the bearing portion is fixed to one of the end portions of the bundle casing, the one of the end portions being disposed outside an outermost portion of the casing in the axial direction.

* * * * *